United States Patent
Peters et al.

(10) Patent No.: US 9,538,867 B2
(45) Date of Patent: Jan. 10, 2017

(54) COMPOSITE BODY AND METHOD OF MAKING THE SAME

(71) Applicant: BASF SE, Ludwigshafen (DE)

(72) Inventors: David D. Peters, Wyandotte, MI (US); Michael Praw, Rockwood, MI (US); Richard Varner, Longmont, CO (US)

(73) Assignee: BASF SE, Ludwigshafen (DE)

( * ) Notice: Subject to any disclaimer, the term of this patent is extended or adjusted under 35 U.S.C. 154(b) by 867 days.

(21) Appl. No.: 13/744,592

(22) Filed: Jan. 18, 2013

(65) Prior Publication Data

US 2013/0186921 A1 Jul. 25, 2013

Related U.S. Application Data

(60) Provisional application No. 61/588,886, filed on Jan. 20, 2012.

(51) Int. Cl.
*D06C 15/00* (2006.01)
*A47F 8/02* (2006.01)
(Continued)

(52) U.S. Cl.
CPC . *A47F 8/02* (2013.01); *B05D 1/02* (2013.01); *B29C 41/003* (2013.01); *B29C 41/04* (2013.01);
(Continued)

(58) Field of Classification Search
CPC .......... A47F 8/00; A47F 8/02; B29C 44/0461; B29C 41/003; B29C 41/04; B05D 1/02; C08G 18/2063; C08G 18/4816; C08G 18/242; C08G 18/4829; C08G 18/3206; C08G 18/246; C08G 18/7664; C08G 18/632; C08G 18/6674; C08G 18/7671; C08G 18/4072

See application file for complete search history.

(56) References Cited

U.S. PATENT DOCUMENTS 3,574,150 A * 4/1971 Jefferson et al. .. C08G 18/5021
206/523
3,639,355 A 2/1972 Wooster et al.
(Continued)

FOREIGN PATENT DOCUMENTS

DE 102007009128 A1 * 9/2007 ......... C08G 18/4854
EP 0619989 A2 10/1994
(Continued)

OTHER PUBLICATIONS

Line-X Web Publication retrieved from website: http://www2.line-x.com/nw/commercial5/html on Nov. 12, 2010, 1 page.

*Primary Examiner* — Nathan Durham
(74) *Attorney, Agent, or Firm* — Howard & Howard Attorneys PLLC

(57) ABSTRACT

A composite body is provided that includes a rigid polyurethane foam shell and an elastomeric polyurethane layer disposed over the rigid polyurethane foam shell. The rigid polyurethane foam shell defines a cavity within the composite body. The rigid polyurethane foam shell has a closed cell content of at least 70% and comprises the reaction product of a first isocyanate component and a first isocyanate-reactive component in the presence of a blowing agent. The elastomeric polyurethane layer is disposed over the polyurethane foam shell. The elastomeric polyurethane layer comprises the reaction product of a second isocyanate component and a second isocyanate-reactive component. A method of forming the composite body includes the step of molding the rigid polyurethane foam shell, demolding the rigid polyurethane foam shell from the mold, and applying (Continued)

an elastomeric polyurethane composition upon the rigid polyurethane foam shell after demolding to form the elastomeric polyurethane layer.

8 Claims, 1 Drawing Sheet

(51) Int. Cl.
| | |
|---|---|
| C08G 18/48 | (2006.01) |
| C08G 18/63 | (2006.01) |
| C08G 18/66 | (2006.01) |
| C08G 18/76 | (2006.01) |
| C08G 18/20 | (2006.01) |
| C08G 18/24 | (2006.01) |
| C08G 18/32 | (2006.01) |
| C08G 18/40 | (2006.01) |
| B05D 1/02 | (2006.01) |
| B29C 41/00 | (2006.01) |
| B29C 41/04 | (2006.01) |
| B29C 44/04 | (2006.01) |
| A47F 8/00 | (2006.01) |
| C08G 101/00 | (2006.01) |

(52) U.S. Cl.
CPC ....... *B29C 44/0461* (2013.01); *C08G 18/2063* (2013.01); *C08G 18/242* (2013.01); *C08G 18/246* (2013.01); *C08G 18/3206* (2013.01); *C08G 18/4072* (2013.01); *C08G 18/4816* (2013.01); *C08G 18/4829* (2013.01); *C08G 18/632* (2013.01); *C08G 18/6674* (2013.01); *C08G 18/7664* (2013.01); *C08G 18/7671* (2013.01); *A47F 8/00* (2013.01); *C08G 2101/0025* (2013.01)

(56) References Cited

U.S. PATENT DOCUMENTS

| | | | | |
|---|---|---|---|---|
| 3,865,284 | A | * | 2/1975 | Kazama ................. A41H 5/00 223/68 |
| 4,543,366 | A | | 9/1985 | Smith |
| 5,071,683 | A | | 12/1991 | Verwilst et al. |
| 5,762,853 | A | | 6/1998 | Harris et al. |
| 5,971,398 | A | | 10/1999 | Broussard et al. |
| 6,432,543 | B2 | | 8/2002 | Harrison et al. |
| 2005/0029706 | A1 | * | 2/2005 | Weyant ............... B29C 33/3885 264/219 |
| 2006/0078870 | A1 | * | 4/2006 | Yu ........................... A41H 1/04 434/396 |
| 2009/0326148 | A1 | | 12/2009 | Schmalkuche et al. |
| 2010/0003466 | A1 | | 1/2010 | Hessler |
| 2015/0056593 | A1 | * | 2/2015 | Lennard ................ G09B 23/36 434/296 |

FOREIGN PATENT DOCUMENTS

| | | | | |
|---|---|---|---|---|
| GB | 1253662 | A * | 11/1971 | ............ B29C 70/08 |
| GB | 2403449 | B | 2/2007 | |
| WO | WO 2006/038102 | A1 | 4/2006 | |
| WO | WO 2008070064 | A2 * | 6/2008 | ............ B32B 25/08 |
| WO | WO 2010/077602 | A1 | 7/2010 | |
| WO | WO 2010/110784 | A1 | 9/2010 | |

* cited by examiner

US 9,538,867 B2

COMPOSITE BODY AND METHOD OF MAKING THE SAME

CROSS REFERENCE TO RELATED APPLICATIONS

This application claims the benefit of and priority to U.S. Provisional Patent Application No. 61/588,886, filed on Jan. 20, 2012, which is incorporated herewith by reference in its entirety.

BACKGROUND OF THE INVENTION

1. Field of the Invention

The invention generally relates to a composite body including multiple layers that comprise polymeric material. More specifically, the invention relates to a composite body including a foam shell that defines a cavity and an elastomeric layer that is disposed over the foam shell.

2. Description of the Related Art

Composite bodies including multiple layers that comprise polymeric material are well known in the art and are used for a range of applications. Such composite bodies may provide many benefits including, but not limited to, ease of manufacture, freedom of design, structural functions, and aesthetic superiority compared to articles that are formed from non-polymeric or non-composite polymeric materials. One particular field in which composite bodies have found beneficial use is for the manufacture of figures or articles such as but not limited to mannequin bodies. In particular, by forming various layers in a mannequin body from polymeric materials, diverse body shapes and features may be produced with expediency, good structural and performance quality. Such benefits also apply to any article having a complex shape and for which aesthetic features are among the features of primary importance, but for which there is a desire for the articles to withstand conditions associated with handling, exposure to sunlight, exposure to slightly elevated temperatures and other environmental conditions like those that may be experienced during transport or when the articles are maintained or displayed in a confined space that is exposed to direct or indirect sunlight.

Mannequin bodies, in particular, have been manufactured in the past based upon various quality specifications. At the lowest tier of quality, blow-molded plastic mannequin bodies have been prepared and sold. However, such mannequin bodies generally have a limited appeal and possibly a short useful lifespan due to the inability to withstand typical environmental conditions to which mannequin bodies are exposed over time. For example, due to the fact that mannequin bodies are often displayed in storefront windows, mannequin bodies potentially display UV degradation (resulting in discoloration and other forms of degradation) and may be exposed to elevated temperatures, which may also result in discoloration and/or breakdown in structural features and properties. However, due to the rate and cost of production, these types of mannequins have and maintain a considerable market presence. Higher quality mannequin bodies are available that are formed from polymeric materials that are better able to withstand the environmental conditions to which mannequin bodies are typically subjected. For example, mannequin bodies constructed of glass reinforced polyester-based polymers provide higher strength and may be better able to withstand elevated temperatures, as compared to blow-molded mannequin bodies, but the labor involved in their manufacture makes then more costly. Application of non-composite, non-reinforced polyurethane has also been utilized for the preparation of mannequin bodies. However, the cost associated with the molding process does not lend itself to the manufacture of a small number of a particular style and the forms made by this method tend to be heavy, making them less desirable when being assembled as a display.

Construction of a mannequin body using a composite structure allows many of the advantages of the various methods of production to be incorporated and addresses issues associated with individual methods. However, existing mannequin bodies having a composite structure with multiple urethane layers often require an overcoating on the urethane layer to provide acceptable aesthetic properties. Traditional overcoatings are formed from acrylic resins, which provide generally smooth finishes and are often paintable. Further, such mannequin bodies tend to be expensive due to the need for higher volumes of material to form the layers of the composite structure. Further still, such mannequin bodies may be vulnerable to physical impact, which may irreparably damage the appearance of the mannequins.

In view of the foregoing, there remains a need to further improve upon existing composite bodies, especially those having complex shapes and for which aesthetic features are of primary importance such as mannequin bodies, by developing composite bodies that are able to withstand elevated temperatures, exposure to UV light, and physical impact while maintaining acceptable aesthetic qualities.

SUMMARY AND ADVANTAGES

The invention provides a composite body that includes a rigid polyurethane foam shell and an elastomeric polyurethane layer that is disposed over the rigid polyurethane foam shell. The rigid polyurethane foam shell defines a cavity within the composite body. The rigid polyurethane foam shell has a closed cell content of at least 70% and comprises the reaction product of a first isocyanate component and a first isocyanate-reactive component in the presence of a blowing agent. The elastomeric polyurethane layer is disposed over the polyurethane foam shell. The elastomeric polyurethane layer comprises the reaction product of a second isocyanate component and a second isocyanate-reactive component. A method of forming the composite body includes the step of molding the rigid polyurethane foam shell, demolding the rigid polyurethane foam shell from the mold, and applying an elastomeric polyurethane composition upon the rigid polyurethane foam shell after demolding the rigid polyurethane foam shell from the mold to form the elastomeric polyurethane layer.

The composite body of the instant invention is capable of being formed to have a complex shape, as is desirable when the composite bodies are used as mannequin bodies. Due to the use of the elastomeric polyurethane layer disposed over the rigid polyurethane foam shell, the composite bodies are able to withstand typical elevated temperatures and physical impact to which mannequin bodies may ordinarily be exposed, while maintaining acceptable aesthetic qualities. Furthermore, when formed in accordance with the instant method, material costs and production times can be reduced without sacrificing the aesthetic qualities or physical performance of the composite bodies for purposes of use as mannequin bodies.

DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
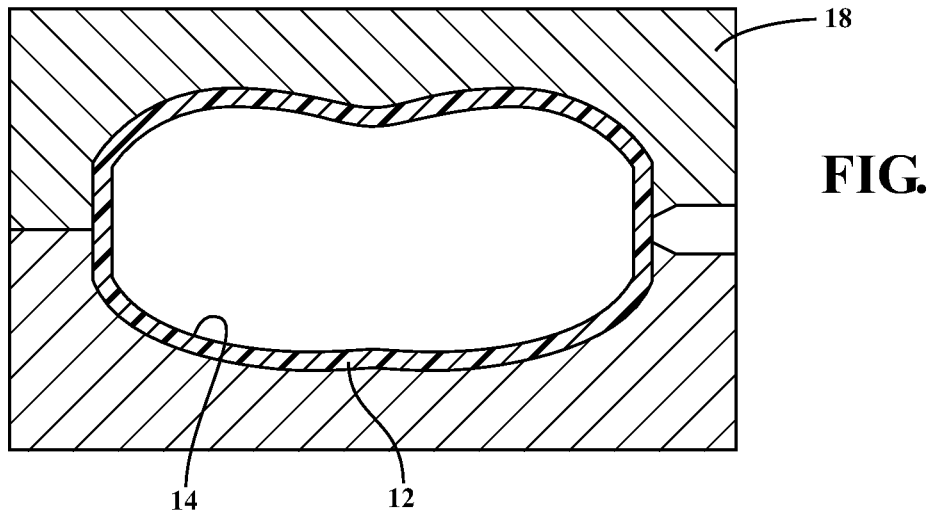
FIG. 1 is a schematic cross-sectional side view of a rigid polyurethane foam shell formed in a cavity of a mold.

A composite body 10 is provided herein that includes a rigid polyurethane foam shell 12 that defines a cavity 14, and an elastomeric polyurethane layer 16 disposed over the rigid polyurethane foam shell 12. The composite body 10 is not limited to any particular application, but provides benefits associated with applications in which there is a desire to provide articles having a complex shape and for which aesthetic features are of primary importance, but for which there is a desire for the articles to withstand environmental conditions associated with handling, exposure to sunlight, and exposure to slightly elevated temperatures such as those that may be experienced when the articles are maintained in a confined space that is exposed to sunlight. One specific example of such an application that can benefit from the instant composite body 10 is a mannequin body 10, for which there is generally a desire to emulate the shape and contours of a human body while providing a consistent aesthetic appearance that is generally free of irregularities such as discoloration, denting, cracking, etc. As referred to herein, "mannequin bodies" may include any part of a mannequin, including the torso as well as extremities, and may include the entire mannequin or only a portion thereof. A mannequin is an article that at least generally represents the shape and contours of a human or animal body.

The rigid polyurethane foam shell 12 provides most of the desirable structural properties to the composite body 10, including providing structural integrity at normal temperatures to which the composite may be exposed when used as a mannequin body 10 (e.g., temperature of up to 140° F.) while still enabling the mannequin body 10 to maintain shape while supporting weight contributed by clothes or other articles disposed thereon. The rigid polyurethane foam also enables the composite body 10 to absorb impact while minimizing the incidence of fracture or breakage.

To provide sufficient structural properties, the foam shell 12 has a closed cell content of at least 70%, alternatively at least 90%, alternatively at least 99%, which characterizes the polyurethane foam as a "rigid" foam. Typically, the rigid polyurethane foam shell 12 referred to herein has a glass transition temperature greater than room temperature (~71° F.)), typically greater than 140° F. As generally recognized by those of skill in the art, foams are rigid at or below their glass transition temperatures especially in glassy regions of their storage moduli. In various embodiments, the rigid polyurethane foam shell 12 has a density of at least 5 lbs/ft$^3$, alternatively from 6 to 15 lbs/ft$^3$ to provide the composite body 10 with the desired structural properties.

The rigid polyurethane foam shell 12 comprises the reaction product of a first isocyanate component and a first isocyanate-reactive component in the presence of a blowing agent. The first isocyanate component typically comprises a polymeric isocyanate, such as polymeric diphenylmethane diisocyanate (i.e., polymeric MDI), and the polymeric isocyanate is typically present in the first isocyanate component in an amount of 100% by weight. However, it is to be appreciated that non-polymeric isocyanates can also be included in the first isocyanate component, and the first isocyanate component may comprise a blend of polymeric and non-polymeric isocyanates, or a blend of polymeric isocyanates. The polymeric MDI has an average nominal functionality of greater than 2, typically about 2.2. Various polymeric isocyanates are commercially available from BASF Corporation of Florham Park, N.J.

The first isocyanate-reactive component may comprise compounds selected from the group of polyols, amines, and combinations thereof. As used herein, a polyol is a molecule that includes more than one isocyanate-reactive group such as a hydroxyl group or an amino group. Typically, the first isocyanate-reactive component comprises a polyol having a nominal functionality of at least 3, which may contribute to fine cell structure of the rigid polyurethane foam shell 12. Specific examples of suitable compounds that may be included in the isocyanate-reactive component include those selected from the group of trimethylol propane-initiated polyether polyols, glycerin-initiated polyether polyols, pentaerythritol-initiated polyether polyols, and combinations thereof and are commercially available from BASF Corporation.

The blowing agent is not particularly limited and can be a physical or chemical blowing agent, or a combination of physical and chemical blowing agents. It is to be appreciated that additional additives may also be utilized to form the rigid polyurethane foam shell 12, and common such additives are generally known in the art.

As alluded to above, the rigid polyurethane foam shell 12 defines a cavity 14 within the composite body 10. In this regard, the rigid polyurethane foam shell 12 generally defines the shape of the composite body 10 and is present in the form of a sheet having a relatively small thickness compared to the overall thickness of the composite body 10, with the thickness of the rigid polyurethane foam shell 12 established based upon the minimum thickness that is necessary to attain the desired structural properties of the composite body 10. In one embodiment, rigid polyurethane foam shell 12 has a thickness of from 2000 to 100 mils, alternatively from 750 to 250 mils, which is generally sufficient to provide the composite body 10 with structural properties that are desirable for use of the composite body 10 as a mannequin body 10.

Figure 3:
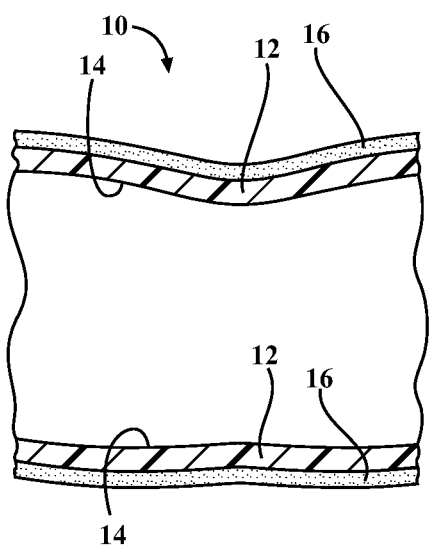
FIG. 3 is a schematic partial cross-sectional side view of a composite body having a rigid polyurethane foam shell that defines a cavity within the composite body, with an elastomeric polyurethane layer disposed over the polyurethane foam shell.

As schematically shown in FIG. 3, the elastomeric polyurethane layer 16 is disposed over the rigid polyurethane foam shell 12, typically opposite the cavity 14 that is defined in the composite body 10, for purposes of enhancing aesthetic features of the composite body 10 and for providing beneficial structural properties to the composite body 10. Typically, as shown in FIG. 3, the elastomeric polyurethane layer 16 is disposed directly upon the rigid polyurethane foam shell 12, in which embodiment the composite body 10 may benefit from excellent adhesion properties between the elastomeric polyurethane layer 16 and the rigid polyurethane foam shell 12. However, it is possible to include one or more intervening layers (not shown) between the elastomeric polyurethane layer 16 and the rigid polyurethane foam shell 12. The elastomeric polyurethane layer 16 is either a show surface to the composite body 10 (in which case no other layers are disposed upon the elastomeric polyurethane layer 16, and in which case the elastomeric polyurethane layer 16 may comprise pigment to provide a desired appearance to the composite body 10) or is paintable to enable finishing of the composite body 10 with a paint layer (not shown) that presents a desired surface appearance. As referred to herein, elastomeric means that the layer 16 is a solid polymeric composition as opposed to a foamed composition, which is necessary to provide an acceptable surface appearance to the composite body 10 regardless of whether the elastomeric polyurethane layer 16 is a show surface of the composite body 10 or whether a paint layer is formed over the elastomeric polyurethane layer 16.

The elastomeric polyurethane layer 16 provides a combination of beneficial properties to the composite body 10 that represent improvements over similar coatings of existing composite bodies. In particular, the elastomeric polyurethane layer 16 not only provides excellent aesthetic properties to the composite body 10, but may also provide resistance to UV degradation and impact resistance while resisting delamination. In particular, the elastomeric polyurethane layer 16 typically has a hardness of at least 65 Shore D at a thickness of 120 to 40 mils, alternatively from 68 to 82 Shore D at a thickness of 100 to 50 mils, alternatively from 70 to 78 Shore D at a thickness of about 80 mils to provide the composite body 10 with excellent impact resistance. Furthermore, when the hardness is less than or equal to 82 Shore D at a thickness of 100 to 50 mils, benefits may be realized in terms of reduced brittleness of the elastomeric polyurethane layer 16, which may enable the composite body 10 to absorb physical impacts without causing significant aesthetic damage to the composite body 10. In particular, the impact can be absorbed by the rigid polyurethane foam shell 12 (which may crush in response to the impact), but the elastomeric polyurethane layer 16 may maintain a normal aesthetic appearance when the hardness of the elastomeric polyurethane layer 16 is less than or equal to 82 Shore D at a thickness of 100 to 50 mils. Furthermore, the elastomeric polyurethane layer 16 may be formed from an elastomeric polyurethane composition that provides production advantages such as sufficiently fast gel times to enable expedient production of the composite bodies.

The elastomeric polyurethane layer 16 comprises the reaction product of a second isocyanate component and a second isocyanate-reactive component. As alluded to above, the elastomeric polyurethane layer 16 is solid, i.e., unfoamed, and therefore is formed in the absence of blowing agents. The second isocyanate component and the second isocyanate-reactive component may be formulated depending upon the conditions under which the elastomeric polyurethane layer 16 is formed, i.e., formulation can take into account humidity conditions that could impact the properties of the resulting elastomeric polyurethane layer 16 as described in further detail below.

The second isocyanate component may be the same or different from the first isocyanate component. The second isocyanate component typically comprises an aromatic isocyanate, and is typically free from aliphatic isocyanates, for purposes of providing the elastomeric polyurethane layer 16 with resistance to UV degradation (especially when the elastomeric polyurethane layer 16 is a show surface of the composite body 10). The second isocyanate component typically includes a modified isocyanate, such as a prepolymer of diphenylmethane diisocyanate (modified MDI), which may contribute excellent elongation properties and impact resistance to the resulting elastomeric polyurethane layer 16. As an alternative or in addition to the modified MDI, the second isocyanate component may include polymeric MDI (similar to the first isocyanate component). In one particular embodiment, the second isocyanate component includes a combination of a modified MDI and a polymeric MDI, which may provide ease of handling and relatively low viscosity to the second isocyanate component as compared to a scenario when pure modified MDI is used. While the particular weight ratio of specific isocyanates is not limited, the modified MDI and polymeric MDI may be present in the second isocyanate component in a weight ratio of from 90/10 to 50/50. Suitable modified MDI and polymeric MDI isocyanates are commercially available from BASF Corporation.

The second isocyanate-reactive component is typically different from the first isocyanate-reactive component and may be formulated to provide the beneficial properties of the elastomeric polyurethane layer 16 as described above, and may further be formulated to attain sufficiently fast gel times. In one embodiment, the second isocyanate-reactive component comprises a tetrol having a hydroxyl number of at least 300 mgKOH/g, alternatively from 300 to 800 mgKOH/g, alternatively from 435 to 770 mgKOH/g as measured in accordance with STI 3162. The hydroxyl number impacts crosslink density in the resulting elastomeric polyurethane layer 16 and may contribute to achievement of the target hardness of the elastomeric polyurethane layer 16. The tetrol typically has 100% secondary hydroxyl capping to temper the exotherm during reaction. Suitable tetrols include those based upon aliphatic amine initiators, such as ethylenediamine, which may provide a beneficial catalytic effect during gelling of the second isocyanate component and the second isocyanate-reactive component to form the elastomeric polyurethane layer 16. Alternatively, the tetrol may be based on an aromatic initiator, which may or may not include amino functionality. An example of an aromatic initiator may be represented by of the formula:

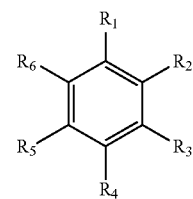

wherein $R_1$ includes one of an alkyl group, an amine group, and a hydrogen and each of $R_2$-$R_6$ independently include one of an amine group and hydrogen, so long as at least one of $R_1$-$R_6$ is an amine group. Therefore, it is to be understood that $R_1$ can be any one of an alkyl group, an amine group, or hydrogen, or any compound including combinations thereof. It is also to be understood that $R_2$-$R_6$ do not have to be identical and each can include an amine group or hydrogen. It is also to be understood that the terminology "an amine group" refers to R—N—H and $NH_2$ throughout the instant application. One specific example of an aromatic initiator represented by the above formula is a toluene diamine. Alternatively, the tetrol may be based on a tetrafunctional alcohol initiator, such as pentaerythritol. Examples of suitable tetrols include, but are not limited to, Quadrol®, Pluracol® PEP series polyols, and Pluracol® 736.

The tetrol is typically present in the second isocyanate-reactive component in an amount of from about 1 to about 95, more typically in an amount from about 10 to about 65, and most typically in an amount from about 15 to about 35, percent by weight based on the total weight of all non-isocyanate components that are present during reaction to form the elastomeric polyurethane layer 16. The term "about" is intended to encompass the specified value in addition to nominal values beyond the specified value, e.g., +/−0.1% from the specified value. It is to be appreciated that a combination of tetrols may be included in the second isocyanate-reactive component, based upon the type of initiator and/or hydroxyl number for the individual tetrols, and that the particular combination of tetrols may be varied based upon reaction conditions, e.g., humidity levels. In one particular embodiment, aliphatic amine-initiated tetrol(s) may be present in the second isocyanate-reactive component in amounts such as from 5 to 12, alternative from 5 to 10 percent by weight based on the total weight of all non-isocyanate components that are reacted to form the elastomeric polyurethane layer 16, which may be useful under conditions of relatively low humidity. In another embodiment, the aliphatic amine-initiated tetrol may be present in the second isocyanate-reactive component in elevated amounts such as from 12 to 20, alternative from 13 to 17 percent by weight based on the total weight of all non-isocyanate components that are reacted to form the elastomeric polyurethane layer 16, which may be useful under conditions of high humidity.

The second isocyanate-reactive component typically further comprises a triol having a hydroxyl number of less than 250 mgKOH/g alternatively from 30 to 100 mgKOH/g, alternatively from 30 to 40 mgKOH/gm as measured in accordance with STI 3162. The triol is typically based upon a tri-functional alcohol initiator such as glycerin. Suitable triols are commercially available from BASF Corporation under the Pluracol® brand of polyols including, particularly, the GP series of Pluracol® polyols. The triol is typically present in the second isocyanate-reactive component in an amount of from about 1 to about 50, more typically in an amount from about 5 to about 40, and most typically in an amount from about 15 to about 35, percent by weight based on the total weight of all non-isocyanate components that are present during reaction to form the elastomeric polyurethane layer 16.

The second isocyanate-reactive component may further comprise a graft polyol, which is different from and is typically present in addition to the tetrol and triol described above and which denotes dispersed polymer solids in a carrier polyol that represents a continuous phase. In one embodiment, the carrier polyol includes a polyether polyol that comprises the reaction product of an initiator and alkylene oxide and the dispersed polymer solids are particles of co-polymerized styrene and acrylonitrile. An example of a suitable graft polyol is Pluracol® 1578, commercially available from BASF Corporation. The graft polyol is typically present in the second isocyanate-reactive component in an amount of from about 1 to about 50, more typically in an amount from about 10 to about 40, and most typically in an amount from about 15 to about 35, percent by weight based on the total weight of all non-isocyanate components that are present during reaction to form the elastomeric polyurethane layer 16. Under conditions of high humidity, it may be useful to provide the graft polyol in an amount from about 10 to 20 percent by weight based upon the total weight of all non-isocyanate components that are present during reaction to form the elastomeric polyurethane layer 16.

The second isocyanate-reactive component may further include a supplemental chain extender. The chain extender is preferably a diol or a mixture of diols. Such diols preferably include any aliphatic, cycloaliphatic, and/or araliphatic diol having from 2 to 14 carbon atoms, more preferably from 4 to 10 carbon atoms. Diol chain extenders are known in the art. The supplemental chain extender is typically present in the second isocyanate-reactive component in an amount of from about 1 to about 30, more typically in an amount from about 5 to about 25, and most typically in an amount from about 10 to about 20, percent by weight based on the total weight of all non-isocyanate components that are present during reaction to form the elastomeric polyurethane layer 16.

The second isocyanate-reactive component may also include one or more additives directed at enhancing the performance of one or more physical properties of the composite and/or the polyurethane polymer. For instance, in one particular embodiment, the second isocyanate-reactive component may include a surface tension-reducing additive, which may assist with enhancing appearance of the elastomeric polyurethane layer 16, especially when the elastomeric polyurethane layer 16 is the show surface of the composite body 10. Examples of surface tension-reducing additives include silicone-based defoamers commercially available from Byk USA, Inc. of Wallingford, Conn. Additionally, a surface wetting additive can also be employed in combination with the surface tension-reducing additive. Additionally still, moisture scavengers may be included in the second isocyanate-reactive component, the amount of which can be varied depending upon the humidity under which the second isocyanate component and second isocyanate-reactive component are reacted. Pigments and UV light stabilizers may also be included in the second isocyanate-reactive component, especially when the elastomeric polyurethane layer 16 is the show surface of the composite body 10.

The second isocyanate component and the second isocyanate-reactive component may be reacted in the presence of a catalyst, and are typically reacted in the presence of a dual catalyst package. Examples of suitable catalysts are organometallic catalysts including organotin catalysts, although it is possible to employ metals such as aluminum, zirconium, lead, titanium, copper, mercury, cobalt, nickel, iron, vanadium, antimony, and manganese. Suitable organometallic catalysts, exemplified here by tin as the metal, are represented by the formula: $R_nSn[X—R^7—Y]_2$, wherein R is a $C_1$-$C_8$ alkyl or aryl group, $R^7$ is optional and if present is a $C_1$-$C_{18}$ alkylene group optionally substituted or branched with a $C_1$-$C_4$ alkyl group, Y is hydrogen or a hydroxyl group, X is an alkylene group, an —S—, an —$SR^8COO$—, —SOOC—, an —$O_3S$—, or an —OOC— group wherein $R^8$ is a $C_1$-$C_4$ alkyl, n is 0 or 2, provided that $R^7$ is not present only when X is an alkylene group. Other suitable catalysts include amine-based catalysts such as, but not limited to, triethylenediamine, N-methylmorpholine, N-ethylmorpholine, diethylethanolamine, N-cocomorpholine, 1-methyl-4-dimethylaminoethylpiperizine, 3-methoxypropyldimethylamine, N,N,N'-trimethylisopropyl propylenediamine, 3-diethylaminopropyldiethylamine, dimethylbenzylamine, ethylhexanoic acid blocked 1,8-Diazabicyclo[5.4.0]undec-7-ene, and combinations thereof. The dual catalyst package typically includes a combination of an organotin catalyst and an amine-based catalyst to promote front-end reaction and back-end gelling, which results in sufficiently fast cure times while ensuring excellent physical properties of the elastomeric polyurethane layer 16. Typically, the reaction between the second isocyanate component and second isocyanate-reactive component results in a gel time of less than 5 minutes, alternatively less than 200 seconds, alternatively from 60 to 200 seconds.

Within the composite body 10, the elastomeric polyurethane layer 16 typically has a thickness of from 50 mils to 150 mils, which is sufficient to provide the desired properties to the composite body 10 that are contributed by the elastomeric polyurethane layer 16 while minimizing material costs. Such thicknesses of the elastomeric polyurethane layer 16 are possible when the composite body 10 is prepared in accordance with the method described below.

The composite body 10 is typically formed in accordance with a method that includes molding the rigid polyurethane foam shell 12 within a mold 18, as shown in FIG. 1. The mold 18 is typically a closed mold, and the step of molding may include rotocasting a rigid polyurethane foam composition that comprises the first isocyanate component, the first isocyanate-reactive component, and the blowing agent to form the rigid polyurethane foam shell 12. While it is possible that polymer molecules may be present within the rigid polyurethane foam that do not contain urethane bonds, the resulting rigid polyurethane foam predominantly comprises polyurethane polymers, e.g., at least 90% by weight of all polymer molecules in the resulting foam comprise urethane bonds. Rotocasting is a method in which the rigid polyurethane foam composition, typically employed as a 2 k system, is introduced into the mold 18 and the mold 18 is randomly rotated to achieve uniform coating of the rigid polyurethane foam composition on the surface of the mold 18. Rotocasting also enables the cavity 14 to be formed in-situ by under-filling the mold 18 with the rigid polyurethane foam composition, in which case the rigid polyurethane foam shell 12 forms through effectively a free-rise foaming process due to the under-filling of the mold 18.

An elastomeric polyurethane composition that comprises the second isocyanate component and the second isocyanate-reactive component may be applied upon the rigid polyurethane foam shell 12 to form the elastomeric polyurethane layer 16. The elastomeric polyurethane composition is typically applied directly upon the rigid polyurethane foam shell 12, although it is to be appreciated that one or more intervening layers may be included between the elastomeric polyurethane layer 16 and the rigid polyurethane foam shell 12. While it is possible that polymer molecules may be present within the elastomeric polyurethane layer 16 that do not include urethane bonds, the resulting elastomeric polyurethane layer 16 predominantly comprises polyurethane polymers, e.g., at least 90% by weight of all polymer molecules in the resulting elastomeric polyurethane layer 16 comprise urethane bonds. The elastomeric polyurethane composition may be a one-part or two-part composition, and may be formed prior to or during application onto the rigid polyurethane foam shell 12.

Figure 2:
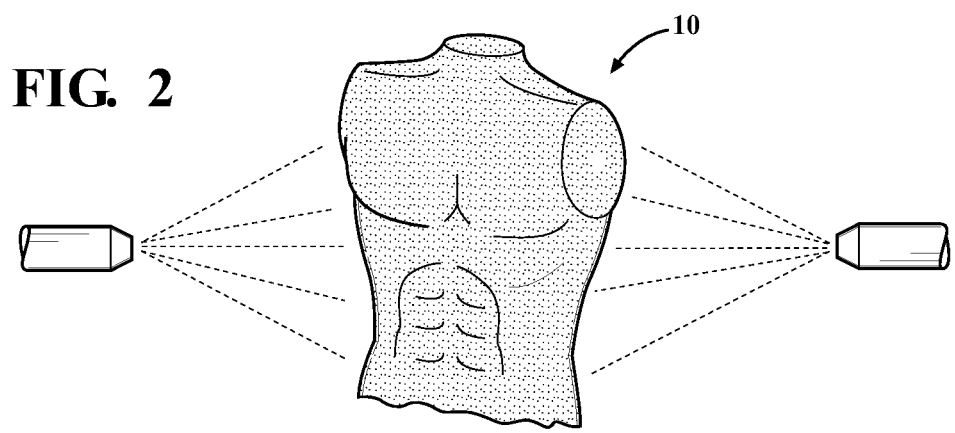
FIG. 2 is a schematic representation of an elastomeric polyurethane composition being applied upon a rigid polyurethane foam shell after demolding the rigid polyurethane foam shell from a mold.

As shown in FIG. 2, the elastomeric polyurethane layer 16 may be formed on the rigid polyurethane foam shell 12 after demolding the rigid polyurethane foam shell 12 from the mold 18, as opposed to an in-mold coating process. While the manner in which the elastomeric polyurethane composition is applied upon the rigid polyurethane foam shell 12 is not particularly limited, in one embodiment the elastomeric polyurethane composition is sprayed upon the rigid polyurethane foam shell 12 as shown in FIG. 2. Advantages may be realized by applying the elastomeric polyurethane composition onto the rigid polyurethane foam shell 12 after demolding the rigid polyurethane foam shell 12 as opposed to an in-mold coating step. In particular, with complex shapes such as mannequin bodies, significant additional time may be required to adequately coat the mold 18 with the elastomeric polyurethane composition to ensure complete and uniform thickness of the resulting elastomeric polyurethane layer 16, especially when rotocasting is used. Furthermore, shrinkage and layer separation could be experienced in the resulting composite body 10 after demolding under circumstances in which the elastomeric polyurethane layer 16 is formed in an in-mold coating process. With application steps such as spraying, expedient and uniform formation of the elastomeric polyurethane layer 16 may be achieved, possibly with the use of less elastomeric polyurethane composition than would be necessary for an in-mold coating process.

As set forth above, the elastomeric polyurethane layer 16 may be a show surface of the composite body 10. However, the elastomeric polyurethane layer 16 is typically paintable and, thus, the instant method may further include the step of applying a paint layer upon the elastomeric polyurethane layer 16.

The following examples are intended for illustrative purposes only and are not to be read in any way as limiting to the instant invention.

EXAMPLES

Examples of elastomeric polyurethane layers were prepared to determine gelling times and Shore D hardness. Observations on brittleness were also made. Table 1 contains details on the elastomeric polyurethane layers of the Examples, and also contains gelling times and Shore D hardness data and an indication of whether or not the samples were brittle (as measured qualitatively by simply dropping the samples on a floor and observing whether or not the sample shattered or cracked). Brittleness is undesirable, but is not necessarily an indication that the sample is unacceptable for the purposes of the instant disclosure.

TABLE 1

|  |  | Ex. 1 | Ex. 2 | Ex. 3 | Ex. 4 | Ex. 5 |
|---|---|---|---|---|---|---|
| Resin | Tetrol 1 | 90.000 | 90.000 | 90.000 | — | — |
|  | Tetrol 2 | — | — | — | 29.000 | 29.000 |
|  | Tetrol 3 | — | — | — | — | — |
|  | Triol 1 | 9.950 | 9.950 | 9.950 | — | — |
|  | Triol 2 | — | — | — | 29.475 | 29.475 |
|  | Graft Polyol | — | — | — | 25.000 | 25.000 |
|  | Chain Extender | — | — | — | 15.000 | 15.000 |
|  | Catalyst 1 | — | — | — | 0.025 | 0.025 |
|  | Catalyst 2 | 0.050 | 0.050 | 0.050 | — | — |
|  | Catalyst 3 | — | — | — | — | 0.014 |

TABLE 1-continued

|  |  |  |  |  |  |  |
|---|---|---|---|---|---|---|
| | Molecular Sieve | — | — | — | 1.000 | 1.000 |
| | S.T.-Reducing Additive | — | — | — | 0.500 | 0.500 |
| | Total | 100.000 | 100.000 | 100.000 | 100.000 | 100.014 |
| Isocyanate Component | Isocyanate 1 | — | — | X | X | X |
| | Isocyanate 2 | X | — | — | — | — |
| | Isocyanate 3 | — | X | — | — | — |
| | Weight Ratio, Resin to Isocyanate | 100:143.9 | 100:169.1 | 100:170.9 | 100:99.6 | 100:99.6 |
| | Gel Time, s | 84 | 60 | 66 | >15 min | 85 |
| | Shore D Hardness @ 24 Hrs | 83-84 | 85 | 83 | 72 | 72 |
| | Notes | Brittle | Brittle | Brittle | — | — |

|  |  | Ex. 6 | Ex. 7 | Ex. 8 | Ex. 9 |
|---|---|---|---|---|---|
| Resin | Tetrol 1 | — | — | 29.000 | 29.000 |
| | Tetrol 2 | 29.000 | 29.000 | — | — |
| | Tetrol 3 | 10.000 | 10.000 | 10.000 | 10.000 |
| | Triol 1 | — | — | — | — |
| | Triol 2 | 29.475 | 29.475 | 29.465 | 29.465 |
| | Graft Polyol | 25.000 | 25.000 | 15.000 | 15.000 |
| | Chain Extender | 15.000 | 15.000 | 15.000 | 15.000 |
| | Catalyst 1 | 0.025 | 0.025 | 0.025 | 0.025 |
| | Catalyst 2 | — | — | — | — |
| | Catalyst 3 | 0.014 | 0.014 | 0.010 | 0.010 |
| | Molecular Sieve | 1.000 | 1.000 | 1.000 | 1.000 |
| | S.T.-Reducing Additive | 0.500 | 0.500 | 0.500 | 0.500 |
| | Total | 110.014 | 110.014 | 100.000 | 100.000 |
| Isocyanate Component | Isocyanate 1 | X | — | X | — |
| | Isocyanate 2 | — | X | — | X |
| | Isocyanate 3 | — | — | — | — |
| | Weight Ratio, Resin to Isocyanate | 100:99.6 | 100:89 | 100:121.7 | 100:102.4 |
| | Gel Time, s | 85 | 129 | 165 | 175 |
| | Shore D Hardness @ 24 Hrs | 72 | 78 | 78-82 | 78 |
| | Notes | — | — | — | — |

Tetrol 1 is a polyether tetrol based upon a tetra-functional alcohol and having a hydroxyl number of from 540 to 570 mgKOH/g and 100% secondary hydroxyl capping, commercially available from BASF Corporation.

Tetrol 2 is a polyether tetrol based upon a tetra-functional alcohol and having a hydroxyl number of from 435 to 465 mgKOH/g and 100% secondary hydroxyl capping, commercially available from BASF Corporation.

Tetrol 3 is a polyether tetrol based upon an aromatic initiator and having a hydroxyl number of from 380 to 400 mgKOH/g, commercially available from BASF Corporation.

Triol 1 is a polyether triol based upon glycerin and having a hydroxyl number of from 222 to 237 mgKOH/g, commercially available from BASF Corporation.

Triol 2 is a polyether triol having a hydroxyl number of from 34 to 36 mgKOH/g, commercially available from BASF Corporation.

Graft Polyol is based upon polyether triol containing about 45% acrylonitrile/styrene copolymer and having a hydroxyl number of from 17 to 21 mgKOH/g, commercially available from BASF Corporation.

Chain extender is diethylene glycol.

Catalyst 1 is a triethylenediamine-based catalyst.

Catalyst 2 is dimethyltin carboxylate catalyst.

Catalyst 3 is a dioctyltin mercaptide catalyst.

S.T.-Reducing Additive, i.e., Surface Tension-Reducing Additive, is a silicone-based defoamer, commercially available from Byk USA, Inc.

Isocyanate 1 is liquid, modified short chain prepolymer based on pure 4,4'-diphenylmethane diisocyanate, commercially available from BASF Corporation.

Isocyanate 2 is a blend of isocyanate 1 and polymeric MDI with a functionality of approximately 2.7 in a weight ratio of 50:50.

Isocyanate 3 is a blend of isocyanate 1 and polymeric MDI with a functionality of approximately 2.7 in a weight ratio of 80:20.

Obviously, many modifications and variations of the present invention are possible in light of the above teachings, and the invention may be practiced otherwise than as specifically described within the scope of the appended claims. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A method of forming a composite body comprising the steps of:
    molding a rigid polyurethane foam shell defining a cavity within the composite body, the rigid polyurethane foam shell having a closed cell content of at least 70% and comprising the reaction product of a first isocyanate component and a first isocyanate-reactive component in the presence of a blowing agent;
    demolding the rigid polyurethane foam shell from the mold; and
    applying an elastomeric polyurethane composition upon the rigid polyurethane foam shell after demolding the rigid polyurethane foam shell from the mold to form an elastomeric polyurethane layer having a hardness of at least 65 shore D at a thickness of from 120 to 40 mils, the elastomeric polyurethane composition comprising a second isocyanate component and a second isocyanate-reactive component.

2. A method as set forth in claim 1 wherein the step of molding comprises rotocasting a rigid polyurethane foam composition comprising the first isocyanate component, the first isocyanate-reactive component, and the blowing agent to form the rigid polyurethane foam shell.

3. A method as set forth in claim 1 wherein the composite body is further defined as a mannequin body.

4. A method as set forth in claim 1 wherein the elastomeric polyurethane composition is sprayed upon the rigid polyurethane foam shell.

5. A method as set forth in claim 1 wherein the second isocyanate-reactive component comprises a tetrol having a hydroxyl number of at least 300 mgKOH/g.

6. A method as set forth in claim 1 wherein the second isocyanate component and the second isocyanate-reactive component are reacted in the presence of a dual catalyst package.

7. A method as set forth in claim 1 wherein the elastomeric polyurethane layer is a show surface of the composite body.

8. A method as set forth in claim 1 further comprising the step of applying a paint layer upon the elastomeric polyurethane layer.

* * * * *